United States Patent [19]
Collee

[11] Patent Number: 5,482,123
[45] Date of Patent: Jan. 9, 1996

[54] METHOD AND APPARATUS FOR PRESSURE CORING WITH NON-INVADING GEL

[75] Inventor: Pierre E. Collee, Kingwood, Tex.

[73] Assignee: Baker Hughes Incorporated, Houston, Tex.

[21] Appl. No.: 328,872

[22] Filed: Oct. 25, 1994

Related U.S. Application Data

[63] Continuation-in-part of Ser. No. 51,093, Apr. 21, 1993, Pat. No. 5,360,074, and a continuation-in-part of Ser. No. 214,392, Mar. 16, 1994.

[51] Int. Cl.$^6$ ..................................................... E21B 25/08
[52] U.S. Cl. .............................. 175/58; 175/226; 175/233
[58] Field of Search ............................. 175/58, 233, 226, 175/399

[56] References Cited

U.S. PATENT DOCUMENTS

| | | |
|---|---|---|
| 2,514,585 | 6/1945 | Natland . |
| 2,537,605 | 8/1947 | Sewell . |
| 2,880,969 | 4/1959 | Williams ................................. 175/226 |
| 3,064,742 | 11/1962 | Bridwell .................................. 175/226 |
| 3,086,602 | 7/1960 | Henderson .............................. 175/404 |
| 3,112,799 | 12/1963 | Gallus ........................................ 175/58 |
| 3,123,158 | 3/1964 | Gallus ................................ 175/226 X |
| 3,207,240 | 9/1965 | Hugel ................................. 175/226 X |
| 3,467,208 | 9/1969 | Kelly ......................................... 175/72 |
| 3,521,715 | 7/1970 | Krutein .............................. 175/226 X |
| 3,548,958 | 12/1970 | Blackwell et al. ....................... 175/233 |
| 3,841,419 | 10/1974 | Russell ....................................... 175/40 |
| 4,098,361 | 7/1978 | Lamothe ............................... 175/60 X |
| 4,256,192 | 3/1981 | Aumann ................................. 175/233 |
| 4,272,987 | 6/1981 | Aumann et al. . |
| 4,312,414 | 1/1982 | Park ........................................... 175/59 |
| 4,321,968 | 3/1982 | Clear ...................................... 166/275 |
| 4,356,872 | 11/1982 | Hyland .................................... 175/58 |
| 4,449,594 | 5/1984 | Sparks ................................. 175/226 X |
| 4,479,557 | 10/1984 | Park et al. ................................. 175/59 |
| 4,598,777 | 7/1986 | Park et al. ................................. 175/58 |
| 4,716,974 | 1/1988 | Radford et al. ........................... 175/59 |
| 4,848,487 | 7/1989 | Anderson et al. ........................ 175/58 |
| 4,981,183 | 1/1991 | Tibbitts .................................. 175/244 |
| 5,178,222 | 1/1993 | Jones et al. ............................. 175/398 |
| 5,360,074 | 11/1994 | Collee et al. ............................. 175/58 |

FOREIGN PATENT DOCUMENTS

| | | |
|---|---|---|
| 0403437 | 6/1990 | European Pat. Off. . |
| 2152109 | 7/1985 | United Kingdom . |

OTHER PUBLICATIONS

Huey, David, P., "New Downhole Tools Improve Core Recovery", Oil & Gas Journal, pp. 42–47, Jan. 23, 1995.
Two–page description of the structure and operation of a prior art Eastman Christensen Pressure Core Barrel (Undated).

*Primary Examiner*—George A. Suchfield
*Attorney, Agent, or Firm*—Trask, Britt & Rossa

[57] ABSTRACT

A pressure core barrel including an inner tube containing a non-invasive gel for encapsulating a core sample. An anti-whirl core bit is employed, and the core bit and inner tube pilot shoe are configured and arranged to prevent damage to the core from drilling fluid. A special high viscosity, low spurt loss coring fluid is employed in the coring operation. When the encapsulated, pressurized care sample is brought to the surface, pressure is bled off and the core sample's chemical and mechanical integrity are substantially preserved by the gel.

17 Claims, 6 Drawing Sheets

METHOD AND APPARATUS FOR PRESSURE CORING WITH NON-INVADING GEL

This invention is a continuation-in-part of U.S. patent application Ser. No. 08/051,093, filed Apr. 21, 1993, now U.S. Pat. No. 5,360,074 which is hereby incorporated herein by reference and a continuation-in-part of U.S. patent application Ser. No. 08/214,392 filed Mar. 16, 1994, also hereby incorporated herein by reference.

BACKGROUND OF THE INVENTION

1. Field of the Invention

The present invention relates generally to coring of subterranean formations, and more specifically to an improved method and apparatus for pressure coring using a non-invading gel to coat and protect the core as it is cut, enters the core barrel, and is retrieved to the surface for analysis.

2. State of the Art

Pressure coring involves recovering a core cut from subterranean formations under downhole ambient temperature and pressure conditions at the coring target site, and retrieving the core to the surface in a pressure-tight core barrel compartment under pressure approximating that at which the core was cut. This is in contrast to a normal coring operation, where the core is cut and retrieved, and during the trip to the surface gases and liquids present within the core tend to bleed out of the core sample as the core barrel is not pressure-tight and the ambient pressure surrounding the core sample decreases with decreasing depth of the borehole.

In order for the data obtained from core to have significance to reservoir engineers, the core to be analyzed must be representative of the reservoir rock. Changes in environmental conditions between the coring target site and the laboratory in which the core is analyzed tend to alter the fluid content and saturation values of a core. Hence, the pressure core barrel was developed to recover cores under pressurized conditions by containing the core in a pressure-sealed chamber or compartment prior to retrieving the core to the surface. Ideally, a pressure core barrel provides the capability to retrieve cores at a controlled pressure in substantial isolation from changes in ambient temperature and pressure and free from gas and liquid leakage.

The first notably successful pressure core barrel was developed by the Esso Production Research Co. in the late 1960's and is described in U.S. Pat. No. 3,548,958 issued to Blackwell et al., the disclosure of which is hereby incorporated by this reference. The device of the '958 patent employed a self-contained high pressure nitrogen gas supply valved through a regulator controlled by expansion of an accumulator compartment to maintain approximate formation pressure of the core sample after it was cut and trapped in the pressure-tight compartment of the barrel.

An improved pressure core barrel operating along generally the same principles as that of the '958 patent was developed by Christensen, Inc., a predecessor company to the assignee of the present invention. The Christensen pressure core barrel and method of operation is described in U.S. Pat. Nos. 4,256,192 and 4,272,987, the disclosures of each being incorporated herein by reference. Drawings from the '987 patent and much of the text describing the preferred embodiment of that core barrel have been employed in the detailed description of the preferred embodiment of the present invention.

While pressure coring has proven to be a valuable tool for formation evaluation, in recent years it has fallen into disuse for several reasons. First, post-coring handling of the core barrel and core as described in the '987 patent, wherein flushing of the drilling mud from the core barrel and freezing of the core are performed, adds complexity to the operation and may be difficult to perform at offshore and other remote sites. Second, drilling fluid invasion of the formation ahead of the bit as well as contamination of the core during the subsequent flushing operation may degrade core quality.

In addition to some deficiencies in pressure coring techniques, improvements in formation testing techniques such as reservoir flow testing and drill stem testing led to a certain degree to a de-emphasis on coring. Reservoir flow testing is employed in producing reservoirs to alternately flow and shut in a producing formation to determine its recovery characteristics and production potential. Drill stem tests also involve the alternate flowing and shutting in of a producing formation and measuring the pressure recovery after the formation is flowed during the shut-in periods. Drill stem tests are traditionally shorter in duration than reservoir flow tests, and most often undertaken during completion of a new well. Many times the formation is initially perforated with the testing string in the borehole, the most popular such operation in recent years being a so-called tubing conveyed perforating operation, where the perforating gun is run into the borehole on the same string as, and below, the testing tools and packer. Such operations, while effective for many purposes, are expensive, entail some substantial risk to personnel, equipment and the formation itself, and do not recover either a sample of producing formation rock or a sample of formation fluids in a relatively pristine condition as they naturally subsist within the formation. Stated another way, the fluids flowing out of the formation which may be trapped in the testing string are not necessarily representative of the fluids in situ in the formation.

Non-pressurized coring can recover formation rock core samples, but the mechanical and chemical properties as well as the fluid contents of such core samples are different from when the core is taken, due to fluids bleeding of the sample under decreasing pressure as the core sample is withdrawn from the borehole. Further, pressure reduction as the core sample is withdrawn results in precipitation of heavy components, such as asphaltene, of the crude oil contained in the sample.

Thus, pressure coring would seem to be an ideal technique for evaluation of the interrelated rock and fluid characteristics of a producing formation, but for certain specific disadvantages including core invasion and post-coring handling. Flushing of the core barrel, either on the surface as described in U.S. Pat. No. 4,272,987 or downhole as described in U.S. Pat. No. 5,356,872, while meritorious in concept, may result in contamination of the core from the flushing fluid by intrusion into the pores in the core samples, displacing natural formation fluids and altering the chemical and mechanical characteristics of the formation rock. Since the core sample may already be of poor quality due to formation invasion by drilling fluid ahead of the bit, operators in many instances have been reluctant to heavily rely upon coring results when making decisions.

The other major disadvantage of state of the art coring techniques, as noted above, is the requirement of freezing the core by packing it in dry ice prior to bleeding off gas pressure, and then maintaining the core sample in a frozen state during transport to a laboratory. This practice may alter the physical and chemical integrity of the core, as well as requiring extra materials, equipment and labor.

It would be highly beneficial to provide a pressure coring system which also afforded the opportunity to cut and preserve the core sample in a relatively pristine state so as to provide a combination of formation rock and fluid for analysis, particularly if the post-coring core handling operation could be conducted in a simple, straightforward manner without detrimental results. However, to date, no state of the art technique offers such advantages.

SUMMARY OF THE INVENTION

The present invention employs a pressure core barrel which is used in combination with a non-invading encapsulating material, preferably a gel which is capable of increasing in viscosity or even solidifying at temperatures slightly lower than at the formation being cored. Significant advantages of the system reside in the full-closure mechanism of the core barrel in combination with the ability to augment pressurization of the core as it is retrieved to the surface and ambient temperature decreases, the end result being the ability to retrieve an encapsulated, substantially non-invaded core containing all fluids naturally residing in the formation rock from which the core is taken.

The pressure core barrel as used in the present invention is preferably employed with an anti-whiff or other stabilized type rotary bit to reduce lateral and vertical movement of the bit and thus of the core barrel during coring, to obtain a physically superior core. The pressure core barrel is further preferably employed with a low invasion core bit and cooperating coring shoe arrangement, so as to provide substantially immediate entry of the core into the core barrel without the possibility of substantial contamination by drilling fluids as the core is cut by inner gage cutters on the throat of the core bit.

The method of the present invention is designed to augment the core-protective features of the pressure barrel, low-invasion core cutting and gel encapsulation aspects of the invention, by providing a bottomhole environment at the formation face ahead of the core bit contemplated to protect the formation rock from drilling fluids damage as the bit drills ahead and cuts the core.

Accordingly, if a medium- or high-permeability formation is to be cored, the method of the present invention may include placing a small quantity or pill of a special, extremely viscous, low spurt loss drilling fluid (hereinafter "coring fluid") compatible with the drilling fluid already in the borehole at the bottom thereof when coring is to be commenced. Whether or not a pill is spotted, the core barrel is run into the borehole with the inner tube filled with a non-invasive gel for encapsulating the core and with gas pressure in the barrel nitrogen reservoir being set to the assumed formation reservoir pressure. The core barrel is then tagged into the pill (if used) and coring fluid having characteristics similar or substantially identical to that described for the fluid pill then may be circulated down to the bit. The bottom of the borehole is tagged and the pill (if used) displaced, and coring commenced as coring fluid circulation reaches the core barrel. The core sample is cut while circulating the coring fluid and encapsulating the sample as the non-invasive gel is extruded about it as the core enters the inner tube. After the core is completed, the core barrel is picked up and the core barrel ball valve closed. The core barrel is retrieved with encapsulated core sample and all core fluids retained under pressure. At the surface, the core pressure is checked and recorded, and then bled off very slowly. The optimum bleeding time for a given core sample is one which minimizes liquid depletion and maximizes gas emanation from the core sample, and which is slow enough to preclude physical damage to the core. While the gas is being bled, the coring fluid in the inner tube/outer barrel annulus is drained. A sample of the core gas may be collected, if desired, during the bleeding process. The depressurized inner tube is then withdrawn from the core barrel for shipment to a laboratory for analysis.

Exemplary benefits offered by the present invention include, without limitation: in situ oil saturation and residual oil saturation of the core sample, due to the non-invasion of the core sample and keeping and collecting solution gas; obtaining a sample of reservoir fluids by keeping in situ all fluids in the sample; elimination of static filtrate invasion and reduction in dynamic filtrate invasion due to the high bridging particle carrying capacity of the encapsulating gel; maintaining the physical integrity of the core sample during cutting through the use of an anti-whirl core bit, a low-invasion inner gage cutter and pilot shoe arrangement, and the reduction in friction between the sample and the inner tube due to the presence of the gel; preserving mechanical properties of the core by keeping the sample under pressure until a controlled bleed-off can be conducted; providing the capability to effectively analyze permeability and wettability of the formation by obtaining and keeping an in situ encapsulated sample until reaching the lab; obtaining a fully preserved rock sample for any desired analysis by eliminating any contact between the reservoir sample and the environment downhole, at the surface and during transportation to the lab; cost effectiveness in comparison to competitive techniques such as sponge coring or traditional pressure coring by reducing analysis costs and surface handling; and enhanced safety in comparison to reservoir flow testing or drill stem testing.

BRIEF DESCRIPTION OF THE DRAWINGS

In order to understand the details of the invention, reference should be made to the following drawings which describe the preferred non-limiting example of the invention. In these figures (where possible) reference numerals have been used which are the same as those used in the equivalent elements of Blackwell et al., U.S. Pat. No. 3,548,958.

In these drawings.

FIG. 1B illustrates the next lower section of the core barrel assembly showing the details of the gas pressurizing valve and the spring mechanism for protecting the core sealing valve, FIG. 1B being in the open coring position, while

DETAILED DESCRIPTION OF A PREFERRED EMBODIMENT

Figure 1:
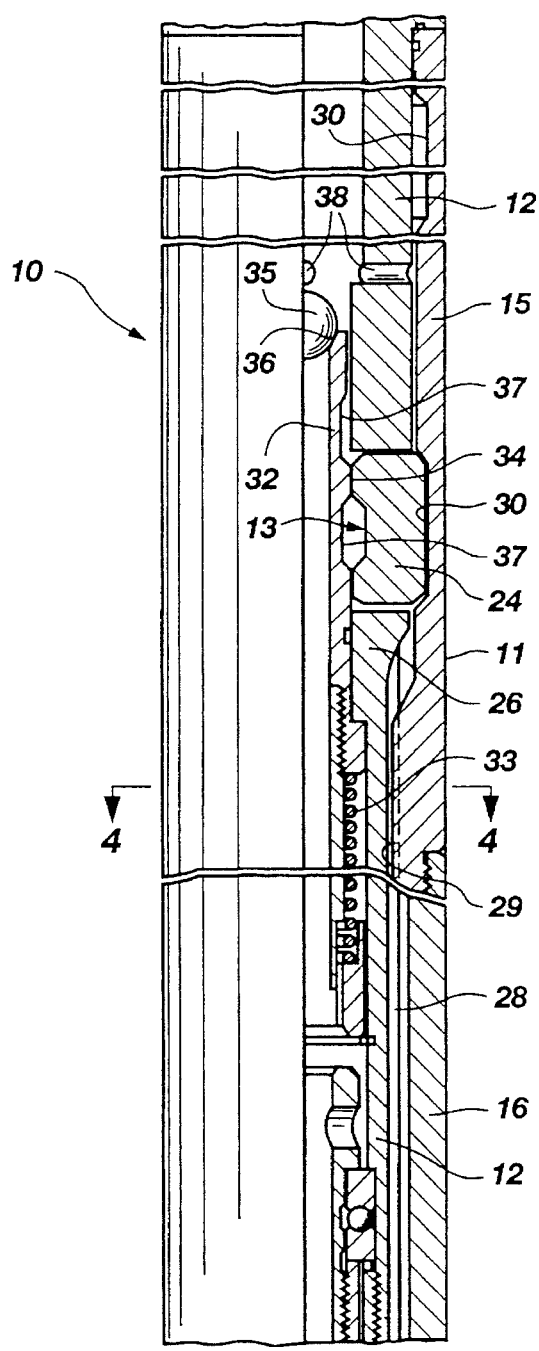
FIG. 1 is a schematic diagrammatic partially sectional view of the top part of the pressure core barrel assembly in the coring position.
Figure 2:
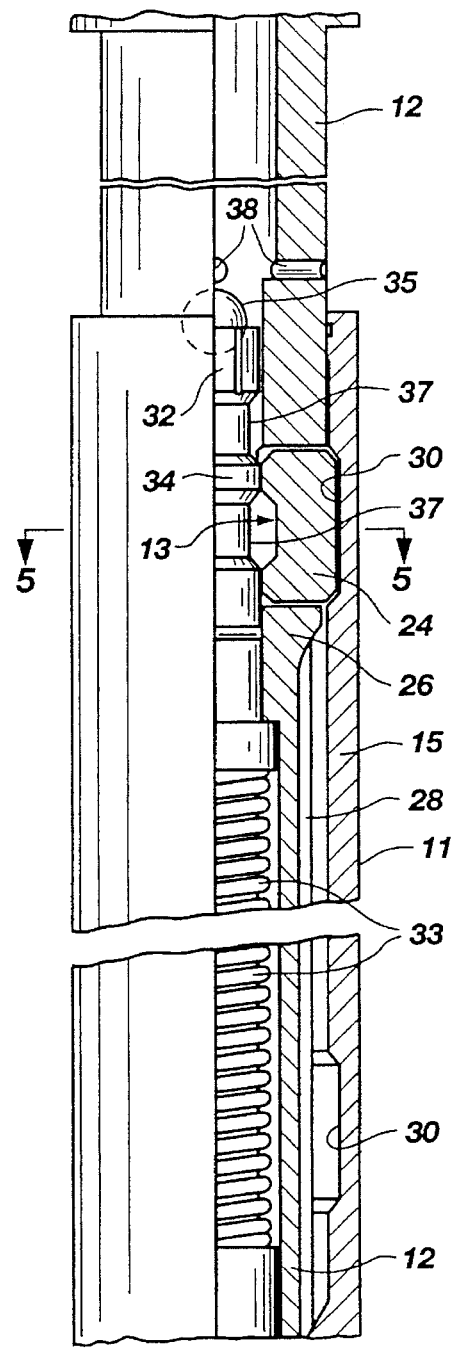
FIG. 2 is similar to FIG. 1 with the core barrel assembly in the sealed position.
Figure 1A:
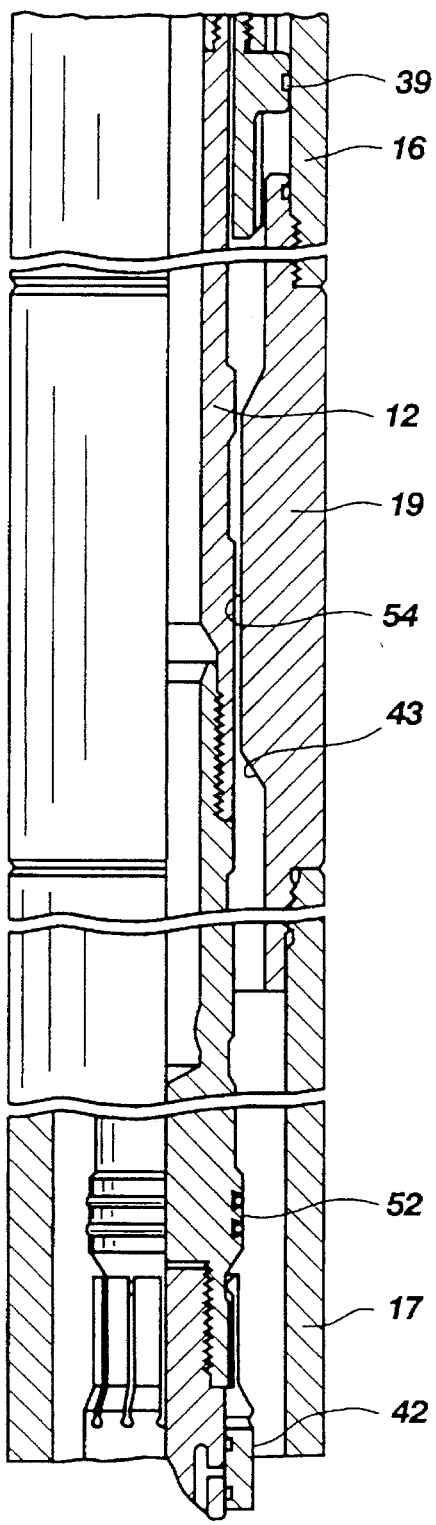
FIG. 1A shows the next lower section of the core barrel assembly where the pressurizing gas source and its valves are located, the assembly being in the coring position.
Figure 3:
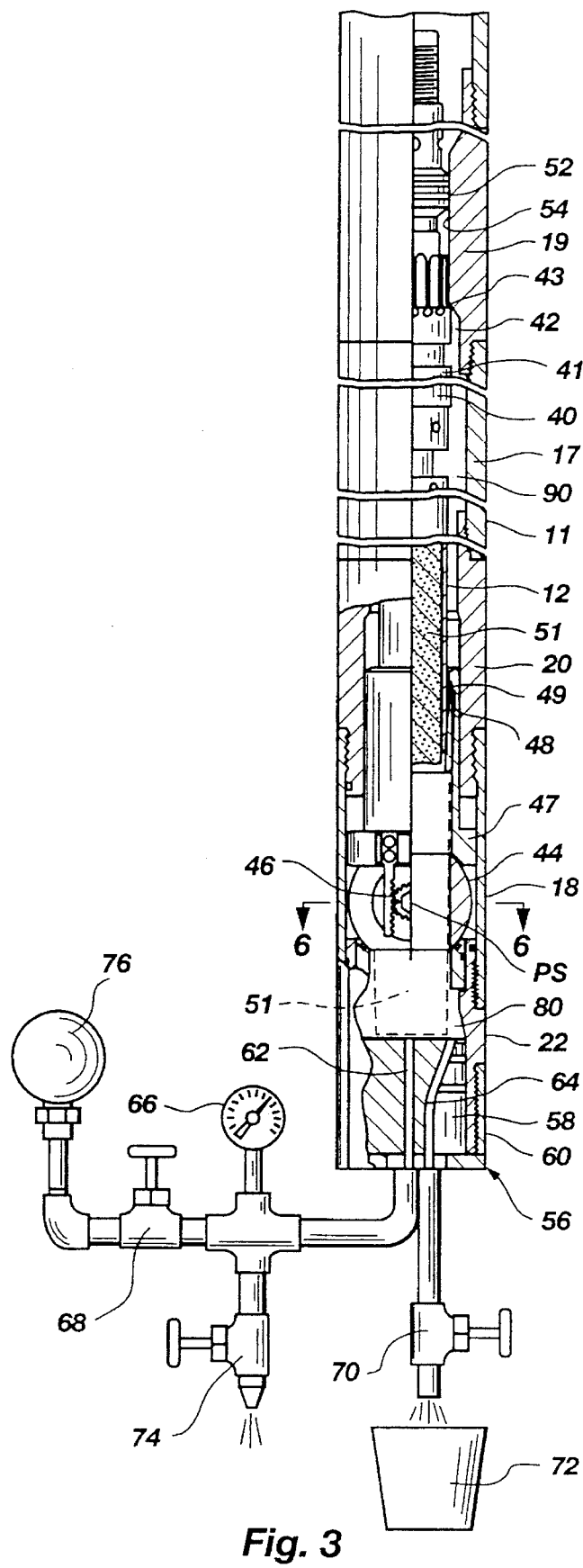
FIG. 3 shows the sealed core barrel assembly mounted with a bleeding and drain system for bleeding of gas frown the core sample and draining of coring fluid from the core barrel prior to removal of the inner tube for shipment of the core to a laboratory for analysis.

Referring now to the details shown in FIGS. 1 through 3, the construction of the core barrel assembly 10 employed in the present invention includes an outer barrel 11 and an inner barrel 12 interconnected by a slip joint assembly generally indicated at 13. The outer barrel assembly 11 is made up of a number of sections indicated at 15, 16, 17 and 18 with several connecting subs 19 and 20. The bottom of the outer barrel assembly is provided with a sub 22 adapted to be connected to the core bit (not shown). Inner core barrel 12 is arranged to be supported by the drill string by means of a conventional thread connection at the top thereof (not shown).

Referring now to the specific detail of construction as shown in FIGS. 1 and 2, it can be seen that the outer core barrel 11 is held in the upper (open) position by means of three dogs 24 carried by an enlarged splined upper section 26 of the inner core barrel support mechanism 12.

Figure 4:
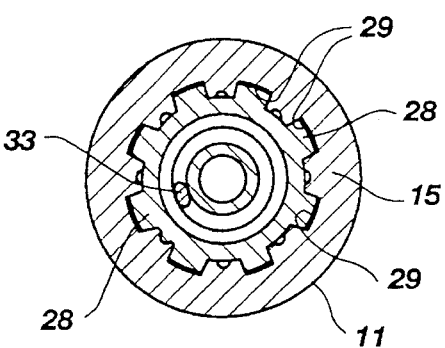
FIG. 4 is a sectional view taken along the line 4—4 of FIG. 1.
Figure 5:
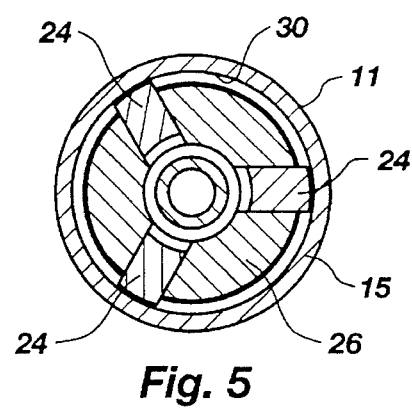
FIG. 5 is a sectional view taken along the line 5—5 of FIG. 2.

In FIG. 4 there is shown the spline 28 which engages female splines 29 on the outer barrel assembly 11. Details of the dogs 24 and their operative grooves 30 are shown in FIG. 5. As can be seen, there are three dogs which operate in the groove 30 and, in a preferred embodiment, there are eight splines. Accordingly, rotation of the splines by one-eighth of a turn on each reassembly of the core barrel assembly provides for rotation of the dogs 24 to engage a different portion of the cylindrical groove 30, thus equalizing wear in these grooves.

Supported on the inner assembly 12 is a latch actuating cylinder 32 which is held in the upper position (as shown) by spring 33. In this position, the full diameter portion 34 of the cylinder 32 bears on the back surfaces of the latch dogs 24 and holds the latch dogs 24 fully extended into the cylindrical groove 30. In FIG. 1, the latch dogs 24 are shown in the lower cylindrical groove 30 and in FIG. 2 they are shown engaged in the upper cylindrical groove 30.

FIG. 1 also shows ball 35 which has been pumped down into a valve seat 36 at the top of the hollow latch actuating cylinder 32. In normal operation, without the ball 35, the drilling mud passes down the axis of the core barrel assembly 10 to the bottom of the core bit in accordance with standard coring practice. When the ball 35 is seated in the valve seat 36, the flow of drilling mud is interrupted and the pressure above the ball 35 increases, tending to force the latch actuating cylinder 32 down. When the full diameter portions 34 of the latch actuating cylinder 32 have moved downwardly a sufficient amount to free the latch dogs for inward motion, these latch dogs are forced into cylindrical grooves 37 carried by the cylinder 32. This releases the outer barrel and permits it to travel from the open position to the closed position shown in FIG. 2. As the latch actuating cylinder 32 is forced downwardly by the hydraulic pressure beating on the ball 35, it compresses the spring 33 as long as the full hydraulic pressure remains above the ball 35. As the outer barrel 11 moves downwardly, the upper end thereof passes opening 38, which allows the full mud pressure in the drill string to be vented to the borehole annulus exterior to the core barrel assembly 10. This venting releases the pressure above the ball 35, allowing the spring 33 to move the latch actuating cylinder 32 to the upward position, thus forcing latch dogs 24 back outwardly when the upper cylindrical groove 30 reaches these dogs and locking the inner barrel 12 and outer barrel 11 in the position shown in FIG. 2.

Referring to FIGS. 1A, 1B, 2A and 2B, there are shown details of the pressure control system and its operating valve. This system in many respects is similar to the pressure control system as described in U.S. Pat. No. 3,548,958. There is a similar pressurized nitrogen reservoir 40, a pressure regulator 41, a cut-off valve 42, and a valve actuator 43. In function these elements are essentially the same as the corresponding elements in Blackwell et al. In the present invention, however, the valve actuator is a shoulder 43 carried by the outer barrel assembly 11 and is arranged to move the cut-off valve 42 downwardly when the outer barrel has reached its lower position. This permits pressurization of the core barrel assembly 10 only after the core barrel assembly 10 is approaching its sealed condition.

Figure 2A:
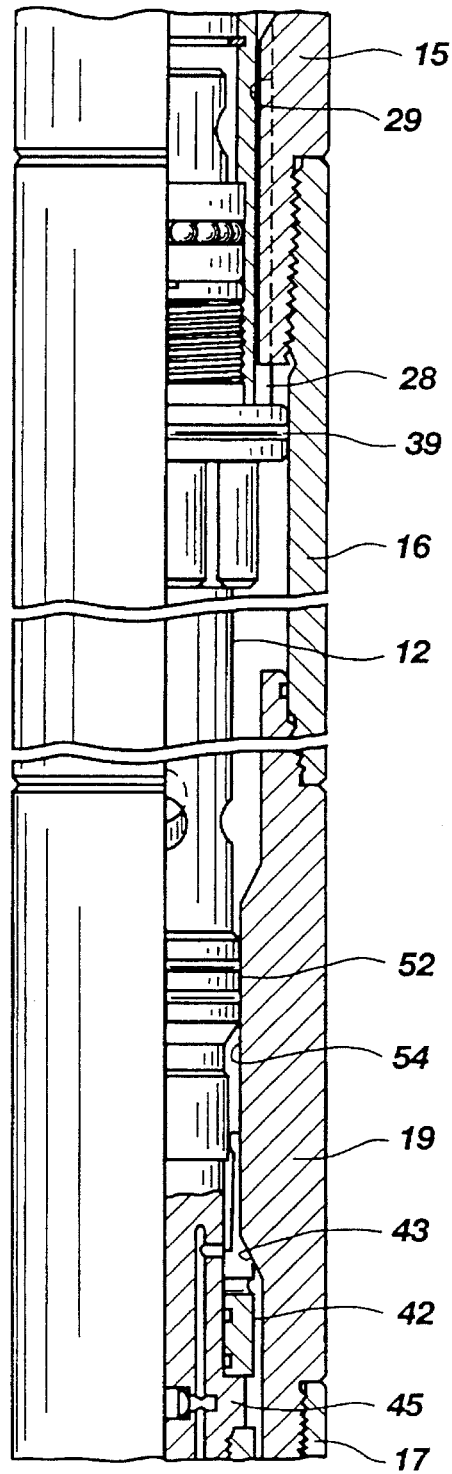
FIG. 2A is like FIG. 1A with the gas pressurizing valve assembly open and the core in the sealed condition.
Figure 1B:
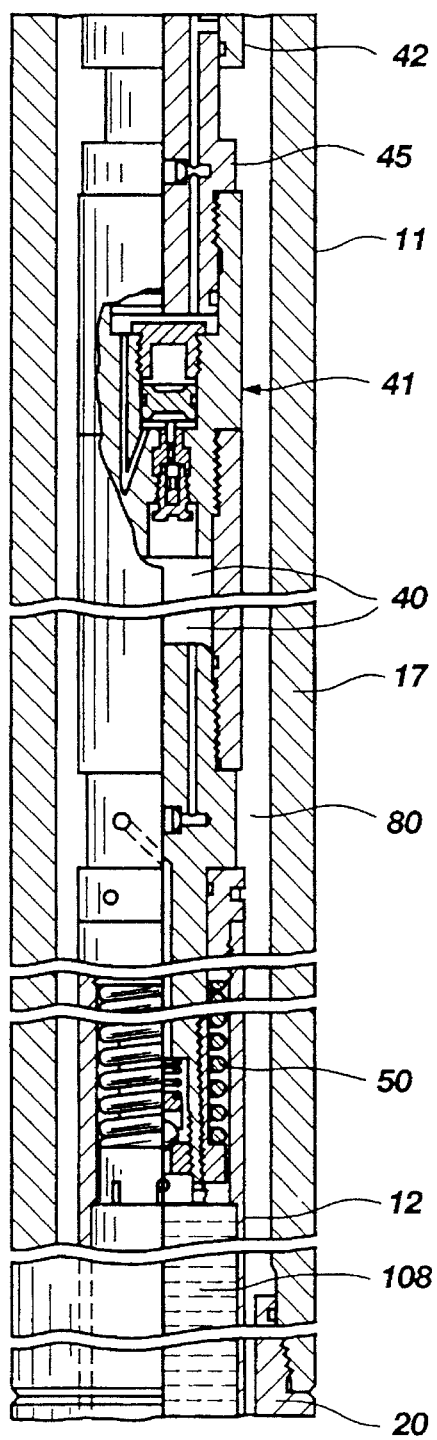
Figure 2B:
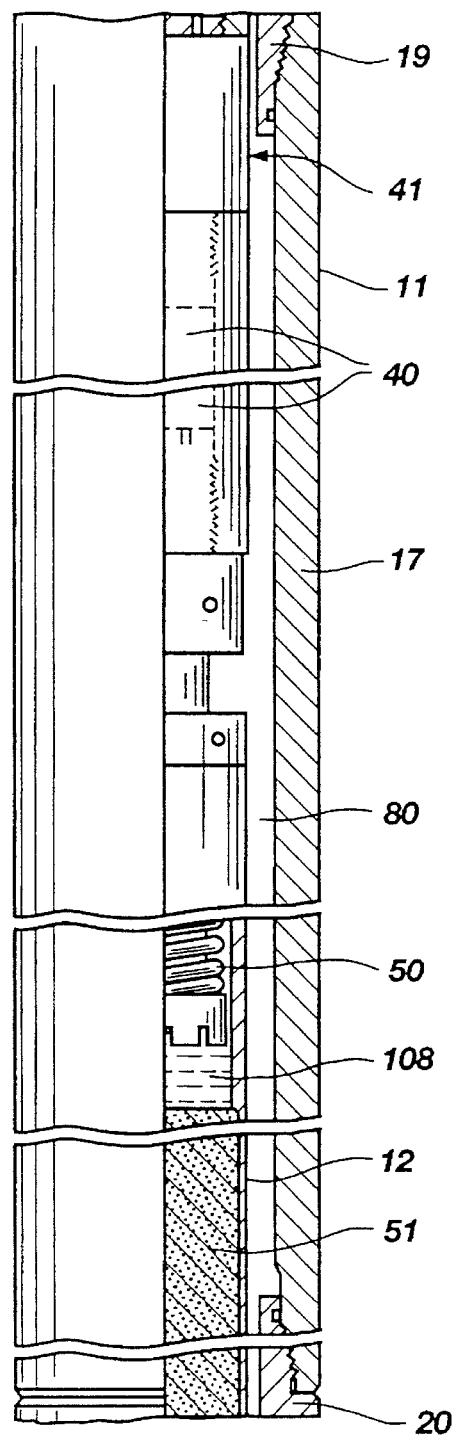
FIG. 2B is similar to FIG. 1B with the elements in the closed sealing position.
Figure 1C:
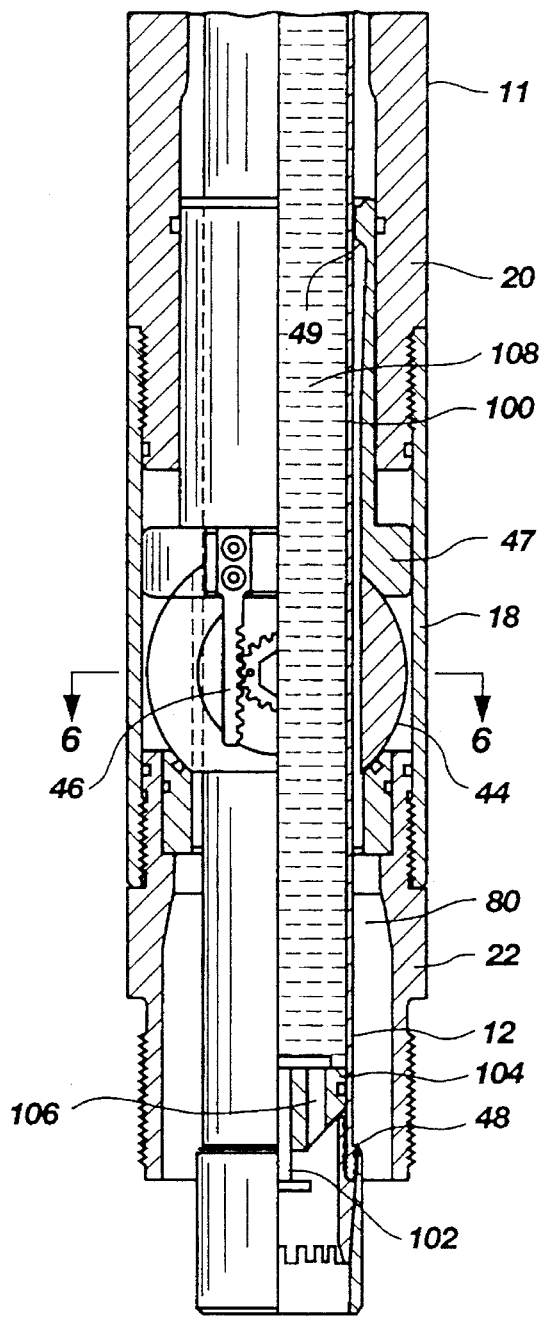
FIG. 1C shows the details of the bottom of the core barrel assembly in the open position and FIG. 2C shows the same portion of the core assembly in the sealed position.
Figure 2C:
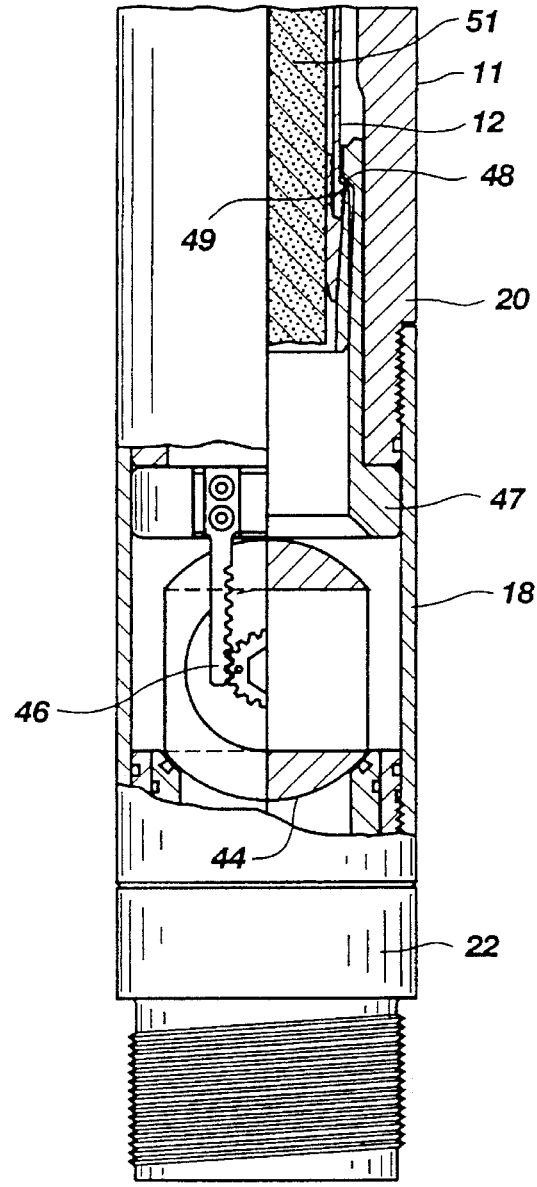

Referring now to FIGS. 1C and 2C the bottom sealing portion of the core barrel assembly 10 is shown in detail. This includes a rotary ball valve of the same type as shown in the Blackwell et al. patent, this valve being indicated at 44 as having a standard rack and pinion actuating mechanism 46 which is carried by a sleeve 47, these elements all being supported by the outer core barrel assembly 11. While a rack and pinion actuating mechanism is depicted, it is equally possible and for many applications more preferred to employ actuating arms rotatably secured to sleeve 47 and to ball 44 on each side of ball 44 at positions offset from me pivot axis of the ball 44, in order to provide a more positive mechanical linkage for ball rotation.

Figure 6:
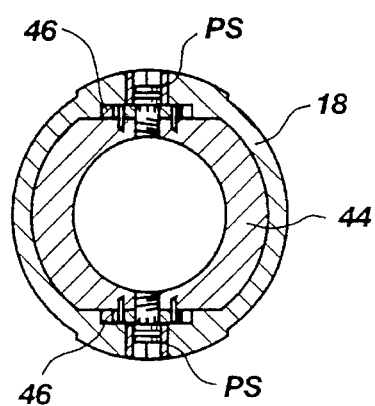
FIG. 6 is a sectional view taken through the ball valve taken along line 6—6 of FIG. 1C and FIG. 3.

As shown in FIG. 6, the rotary ball valve 44 is attached to axially aligned rotatable shoulder pivot screws PS with outer head or bearing portions journalled for rotation in aligned bearing-like apertures in section 18 of the outer barrel assembly 11. Each of the head portions accessible from the exterior of the outer barrel section 18 has a recess of polygonal shape adapted to receive a suitable allen wrench for rotating the pivot screws PS and attached rotary ball valve 44. Alternatively, the heads may be slotted to receive a screw driver or other suitable tool or wrench.

Adjacent the large outer head, each pivot screw PS has a partially threaded portion extending through a pinion gear fixed with pins to each opposite side of the ball valve 44 and rotatable therewith by axial movement of the engaging rack of the rack and pinion mechanism 46.

Preferably one of the pivot screws has a right hand thread portion and the other has an opposite or left hand thread portion which prevents loosening thereof during rotation of the rack and pinion mechanism 46.

Thus, it can be seen that the pivot screws PS including the attached rotary valve ball 44 and pinion gear 46 can be rotated relative to and from the exterior of the outer barrel section 18 by inserting a suitable allen wrench into the recess of a pivot screw PS and turning it to either close or open the rotary valve 44.

As the outer barrel 11 moves downwardly past the end of the inner barrel 12 during the sealing operation, an enlarged section 48 on the end of the core barrel engages shoulder 49 on the upper portion of the valve actuating sleeve 47. As the outer barrel 11 continues to move downwardly, the actuating sleeve 47 moves upwardly relative to the ball valve 44, thus actuating the rack and pinion 46 and closing the ball valve 44 to a position shown in FIG. 2C. In the event there is an obstruction, closing of the ball valve 44 is prevented by compression of the spring 50 which supports the bottom of the inner barrel 12, as seen in FIG. 2B. This spring 50 is only partially compressed in the normal operation of the valve closing motion. The core sample is shown at 51.

In connection with the arrangement of elements shown in detail above, it should be noted that the upper diameter of the outer core barrel which is subjected to full mud pressure is greater than the diameter of the inner core barrel where it is sealed to the outer barrel at seal 39. Accordingly, there is a greater hydraulic force pushing downwardly on the outer barrel than on the inner barrel. Thus the outer barrel will be forced downwardly, not only by the force of gravity, but by this differential hydraulic pressure. This has the advantage of assuring that the outer barrel 11 is moved downwardly to its sealed position despite friction in the borehole or other obstructions which might tend to prevent free travel of the outer barrel 11 down to the closed position.

Outlet bleed and drain means are provided to bleed off gas pressure and drain coring fluid frown the sealed pressure core barrel after it is brought to the surface, and to optionally collect a gas sample during the bleeding process. The bleeding and draining operation is performed after the core barrel 10 is disconnected from the drill string and core drill bit prior to removal of the inner tube 100 containing the encapsulated core 51 (the encapsulation material and process being hereinafter described) for analysis. The outlet bleed and drain means, and consequently the procedures used therewith, are much simpler and more straightforward than those described in the previously-referenced U.S. Pat. Nos. 4,256,192 and 4,272,987.

Outlet bleed and drain means 56 comprises a plug 58 with several passages therethrough, plug 58 being retained in the sub 22 by an outlet end cap 60 threaded onto the sub 22 after the core bit has been removed therefrom. Passage 62 is used to bleed off gas pressure from core sample 51, and passage 64 to drain coring fluid trapped in the outer barrel/inner tube annulus 80 into receptacle 72 for disposal. A pressure gauge 66 and appropriate valves 68, 70 and 74 are also employed. A small pressure vessel 76 may be employed to trap a sample of formation gas under pressure.

The operation of the device of the present invention is like that of Blackwell et al. When the core sample 51 has been taken, the whole assembly is raised a few feet off the bottom of the drill hole in preparation for sealing off the core sample. Ball 35 is then pumped down the drill string until it seats on the valve 36. At this point the pressure in the drilling mud increases compressing the spring 33, thus moving latch actuating cylinder 32 downwardly. This releases the dogs 24 which move out of the lower cylindrical groove 30, thus releasing the outer barrel 11 to travel down, both under the force of gravity and the differential hydraulic pressure. The downward motion of the outer barrel continues until the differential pressure is released by the uncovering of the vent hole 38 as the top of the outer barrel 11 passes below these vent holes. At this point the pressure drop above the ball 35 will be indicated at the well head. The mud pumping is then slowed and the spring 33 now has an upwardly exerting force on the actuating cylinder 32, thus tending to push the dogs 24 outwardly so that they are forced into the upper cylindrical groove 30 as soon as it is in the position shown in FIG. 2. The fact that the dogs have positively engaged the upper cylindrical groove 30 can be determined by lowering the assembly to the bottom of the drill hole. If these dogs are latched, the outer core barrel will be retained in its locked position and the mud pressure will be continually vented through the relief holes 38. If the dogs are not latched, the outer core barrel will be pushed upwardly to seal these holes 38 and the hydraulic pressure will rise again in the interior of the drill string.

As the outer core barrel moves downwardly, the shoulder 43 engages the upper portion of the nitrogen cut-off valve 42 and moves it downwardly to the position shown in FIG. 2A, providing pressurization of the core barrel. At the same time the nitrogen seal 52 has moved into the restricted cylindrical portion 54 of the outer core barrel forming the upper seal for the portion of the core barrel assembly to be pressurized by the nitrogen. The portion 54 is carded by the inner cylindrical surface of the sub 19. As pointed out above, the pressurization of the space below the seal formed by elements 52 and 54 does not take place until the outer barrel 11 has moved essentially to the bottom of its path of travel.

In addition to opening the nitrogen cut-off, the movement of the valve 42 downwardly to the shoulder 43, positively prevents further downward motion of the outer barrel 11.

As mentioned previously, the downward travel of the outer barrel has also actuated the ball valve 44 to close this valve and seal the core assembly. The core assembly is now at the predetermined pressure established for the sample. The sample is now raised to the surface in its sealed, pressurized condition. At the surface all of the outer barrel structure above the sub 19 may be removed as well as all of the inner core barrel assembly above the seal 52. The bleed and drain means 56 may then be pressurized with nitrogen via passage 62 to substantially equalize pressure across valve ball 44. With an allen wrench inserted into a pivot screw PS, the rotary valve ball 44 is then rotated to the open position and the internal pressure of core barrel 10 determined with the pressure gauge 66. When valve ball 44 is rotated to its full open position, encapsulated core sample 51 is permitted to move downwardly through the valve ball 44 as shown in broken lines in FIG. 3 to abut the upper face of plug 58. Passage 62 is contacted by the lower face of core sample 51, while passage 64 communicates with annulus 80 surrounding core sample 51. A formation gas sample may then be taken into pressure vessel 76 by bleeding gas through passage 62 via valve 68. The gas bleeding is then continued through passage 62 and valve 74 while coring fluid from annulus 80 is drained through passage 64 and valve 70 into receptacle 72. The bleeding and draining is continued until pressure inside core barrel 10 reaches surface ambient. At that point, bleed and drain means 56 is removed from the end of core barrel 10, and inner tube 100 with core sample 51 withdrawn for shipment to a laboratory for analysis.

In those cases where the pressure core barrel assembly is designed to contain a maximum pressure of approximately 5,000 p.s.i., the present invention permits taking a core sample at a depth having a pressure substantially in excess of 5,000 p.s.i. The core barrel is then raised to a depth on the order of 5,000 p.s.i. and then the slip joint assembly is tripped to seal the core at said 5,000 p.s.i. and the pressurized core is then raised to the surface. Where very high pressure coring is to be done and the intermediate pressure sealing is employed, a rupture disc (set for 6,000 p.s.i. for example) can be used to prevent surface explosions if the core barrel has been inadvertently sealed under abnormally high ambient pressure.

Figure 7:
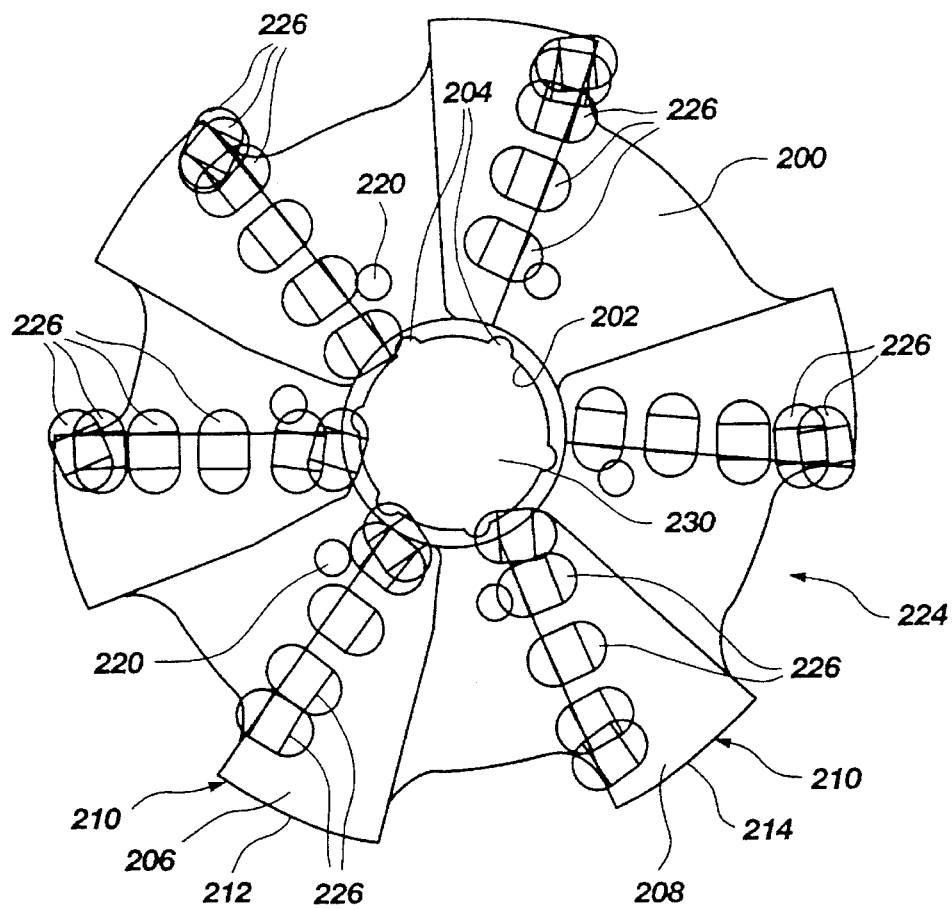
FIG. 7 is a view looking through the bit face of an exemplary anti-whiff core bit suitable for use with the present invention.

Referring now to FIG. 7 of the drawings, exemplary anti-whirl core bit 224 is illustrated, looking downward through the bit face 200 as it would be oriented in the borehole. In use, core bit 224 is secured to the lower end of outer barrel 11 of core barrel 10, in lieu of a conventional core bit. Placements of PDC cutters 226 are schematically shown on bit face 200, certain cutters 226 extending radially inwardly from inner gage 202 defining throat 230 of bit 224, whereby a core may be cut of less diameter than that of throat 230. Channels 204 are placed about the inner gage 202 to permit drilling fluid flow, if desired, past the exterior of the core. Other fluid passages 220 extend through bit face 200. While anti-whir bits are now well known in the art, it should be noted that blades 206 and 208 of core bit 224 are devoid of cutters at outer gage 210, and that gage pads 212 and 214 on blades 206 and 208 are used as bearing surfaces for core bit 224 to ride against the wall of the borehole. Selected size, placement and orientation of cutters 226 on bit face 200 result in a cumulative directed side or lateral force vector oriented in a direction perpendicular to the bit axis and between blades 206 and 208, causing gage pads 212 and 214 to ride substantially constantly against the borehole wall and eliminating vibration and the tendency toward bit whirl. As a result, a very precisely dimensioned, cylindrical core sample is cut, without the tendency toward spiraling which is exhibited in core samples cut using conventional core bits.

Figure 8:
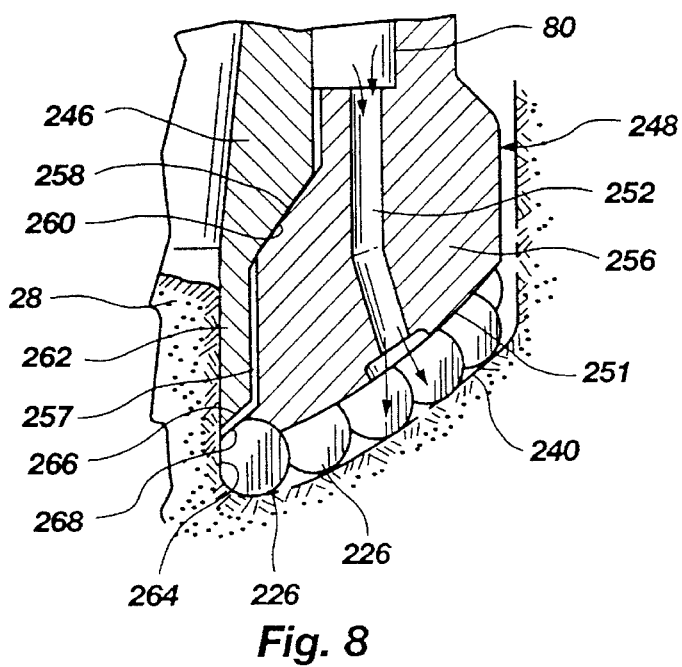
FIG. 8 is a vertical sectional elevation of an exemplary low-invasion core-cutting and receiving arrangement suitable for use with the present invention.

Referring now to FIG. 8 of the drawings, a low-invasion inner gage cutter arrangement on low-invasion core bit 248 is shown with cooperating coring shoe 246 as illustrated in the aforementioned U.S. Pat. No. 4,981,183. Such an arrangement is preferably used in conjunction with core barrel 10 and with an anti-whirl bit cutter placement and gage bearing surface design such as described with respect to core bit 224. Core bit 248 can be a variety of shapes, but preferably has a generally parabolic profile as indicated generally at 251. Alternatively, other profiles can be utilized to advantage. As an example, generally flat sides, giving the bit a generally conical form may be utilized. Body member 256 of core bit 248 includes a plurality of passageways 252 which provide fluid communication between annulus 80 within core barrel 10 and discharge apertures 240 in the face of bit 248. A plurality of cutters 26, preferably PDC cutters, are preferably distributed along the profile of bit 248.

Body member 256 preferably includes a lower bore 257. At least one inner gage cutter 226, and preferably two or three such cutters 226 circumferentially spaced, extend inwardly of the surface defining bore 257 of core bit 248 to cut an inside gage, i.e., the external diameter of a core 28. Each individual gage cutting element 226 is preferably formed with a flat 264 at this gage dimension, which is smaller than bore 257. Thus, annular lip or pilot section 262 of coring shoe 246 may extend downwardly to a position so that its tip 266 is immediately adjacent the upper edge 268 of cutters 226 within the annular space provided by cutters 226 between the different diameters defined by flats 264 and bore surface 257. Core bit 248 includes a shelf 258 on its inner surface below bore 257, which is contacted by bearing surface 260 and thereby forms a restriction, and ideally substantially a fluid seal, between the rotating bit and tile stationary core barrel. With tile foregoing arrangement, the core exterior is precisely cut and the core 28 enters the coring shoe 246 immediately upon leaving the upper edges of cutter flats 264. The preferred profile 251 in combination with the orientation and location of the exits of passageways 252 away from the inner gage of the core bit 248 promote improved flushing of formation cuttings as well as minimizing exposure of the core to drilling fluid, thus enhancing both the mechanical and chemical integrity of the core sample. It will be evident to one of ordinary skill in the art that the lower inner tube arrangement shown in FIGS. 1C and 2C and the core bit shown in FIG. 7 may be modified to a low-invasion structure by differently configuring the inner gage of core bit 224 and using an extended coring shoe with a pilot portion, both as shown in FIG. 8. Of course, channels 204 on the inner gage of core bit 224, as shown in FIG. 7, would be eliminated.

The composition of the gel encapsulating material of the present invention will vary depending upon the characteristics of the formation to be cored. For example, a highly permeable formation will require a highly viscous material so that the encapsulating material will not invade the formation. In contrast, a tighter formation with very little permeability will not require such a highly viscous encapsulating material because the tendency of the material to invade the formation will be reduced.

One of the most important factors influencing the composition of the encapsulating material will be the expected temperatures downhole and during the trip to the surface. The temperatures typically encountered downhole range between about $37.78°–182.22°$ C. ($100°–360°$ F.). Thus, the encapsulating material preferably should begin to increase in viscosity or to solidify at temperatures ranging between about $37.78°–93.33°$ C. ($100°–200°$ F.).

During the trip to the surface, the encapsulating material must reach at least a viscosity that is capable of protecting the integrity of the core sample during transport to the surface. That viscosity must be reached before the core sample begins to lose mechanical and/or chemical integrity. Materials that are useful in the present invention tend to supercool, or to remain liquid, even at temperatures below their normal melting range. Nevertheless, the material must be able to viscosify or even solidify before the integrity of the core is adversely affected. If the expected downhole temperatures are relatively high, then the encapsulating material should be capable of reaching a sufficient viscosity at a relatively high temperature. If the expected downhole temperatures are relatively low, then the encapsulating material should be capable of reaching a suitable viscosity at a relatively low temperature.

Use of the encapsulating material, alone, should maintain substantially complete mechanical integrity of the core sample during transport; however, use of the encapsulating material, alone, is often not sufficient to maintain complete chemical integrity of the core sample. When compared to other available options that do not use a pressure core barrel, use of the encapsulating material does maximize the chemical integrity of the core sample. If complete chemical integrity is required, however, the encapsulating material is used in combination with the pressure core barrel described above in accordance with the present invention, as the use of both the encapsulating material and a pressure core barrel will virtually guarantee the chemical integrity of the core sample.

The encapsulating material could be comprised of any number of materials that are capable of increasing in viscosity and/or solidifying under the particular conditions to be experienced downhole. At very low formation temperatures, such materials might even include extremely viscous drilling polymer mud which should solidify during transport and at least protect the mechanical integrity of the core sample.

A preferred encapsulating material for use in the present invention includes at least one derivative from the oxyalkylene polymer family, preferably a polyglycol, a polyethylene glycol, or a chemically modified polyglycol, which may be used alone or in combination with a thickener, such as colloidal silica or clay. Also, it may be advantageous to add a powder which may swell when it contacts water so that it seals the pores of the core sample in the presence of water. For example, a powder such as calcium carbonate or a swelling type of clay, such as sodium bentonite, may be used.

A preferred encapsulating material for use in the present invention is a polyethylene glycol having the following structure:

$$OR-(CH_2CH_2O)_n-H$$

wherein R is selected from the group of a hydrogen or a methyl group. The value "n" represents the number of repeating polyethylene oxide units in the polymer, and can range between about 20–181, depending upon the preferred molecular weight of the encapsulating material.

The preferred molecular weight of the encapsulating material should be determined based on the permeability of the formation to be sampled. The likelihood that the polyethylene glycol derivative will permeate the core sample decreases as the molecular weight of the polyethylene glycol derivative increases. Thus, depending upon the value of "n," the molecular weight of polyethylene glycol derivatives used in the present invention may vary between about 400–20,000 units.

A preferred encapsulating material, which should be useful in encapsulating samples from formations having a wide range of permeabilities, contains a combination of two polyethylene glycol derivatives, such as "CARBOWAX", which may be obtained from any number of suppliers. One derivative is a hard, waxy, white solid in powder or flake form which has a melting or freezing range of 60°–63° C. (140°–145.4° F.), is about 63% water soluble at 20° C. (68° F.), has a viscosity of about 822 centistokes at 98.89° C. (210° F.), and has a molecular weight of about 8,000 ("8M," e.g., "CARBOWAX Polyethylene Glycol" 8,000). The other derivative is a hard, waxy, white solid in powder or flake form which has a melting or freezing range of 61°–64° C. (141.8°–147.2° F.), is approximately 65% water soluble at 20° C. (68° F.), has a viscosity of 18,650 centistokes at 98.89° C. (210° F.), and has a molecular weight of about 20,000 ("20M," e.g., "CARBOWAX Polyethylene Glycol" 20,000). The ratio of the 8M:20M derivatives, respectively, may vary widely depending upon the characteristics of the formation, with a preferable range being between about 1:1 and 1:10, and a more preferable range being between about 1:1–1:3. For example, if the formation is very fragile, then a lower viscosity will be desired; therefore, the ratio of 8M derivative should be increased.

As discussed above, this preferred combination of polyethylene glycol derivatives may be supplemented with a thickener, such as a colloidal silica or clay, preferably at about 5–10% by weight, more preferably at about 5–6% by weight. It also would be desirable if the encapsulating material contained a sealing agent capable of sealing the pores of the core sample and preventing water from invading the core during coring if water is present. This sealing agent could be the thickening agent, itself, or a separate powder, such as calcium carbonate or another inert material capable of swelling and filling the pores of the core sample. If a separate powder, such as calcium carbonate, is used, then that powder should be present at between about 10–20% by weight, and more preferably between about 10–12% by weight.

Another desirable supplement or additive is a nucleating agent which would increase the heat transfer properties of the encapsulating material and enhance the rate at which the viscosity or solidity of the material would increase, particularly downhole where the temperature is higher. Preferred nucleating agents would include powdered metals, such as copper or aluminum, preferably at about 5–10% by volume (about 25–50% by weight), and more preferably at about 7–8% by volume (about 35–40% by weight). Such nucleating agents preferably should have very fine particle size, most preferably less than 15 microns.

A preferred embodiment of the encapsulating material would contain both a thickener and a nucleating agent which was capable of acting as a heat sink or a heat transfer agent, preferably powdered copper or aluminum. This combination of thickener and powdered metal as additives should have a synergistic effect which would enhance the rate at which the viscosity or solidity of the material would increase. A synergistic effect would arise because the particles of the thickener, themselves, would act as a nucleating agent at lower temperatures. In other words, the powdered metal would (1) act as a heat sink or a heat transfer agent, and therefore enhance the rate at which the viscosity or solidity of the material increased downhole at higher temperatures, and (2) act as a nucleating agent or a triggering agent, "triggering" the encapsulating material to begin crystallizing farther downhole than might be expected otherwise.

While the powdered metal was performing this heat sink/heat transfer function, the core sample would be moving toward the surface. At some point, the encapsulating material would become cool enough that the thickener particles, themselves, would begin to act as nucleating agents. At that point, the rate at which the encapsulating material increased in viscosity or solidity would become much more rapid. This rate increase would be due, at least in part, to the fact that the particles of the thickener are very small, and therefore a vast number of particles would be available to act as "triggers" for crystallization. If the encapsulating material actually solidifies, then it should form a friable, waxy solid which may be removed easily once the core sample reaches the surface.

If desired in the practice of the invention with core barrel 10, a piston 102 (see FIG. 1C) having at its upper end a rabbit 104 is located at the bottom of the inner tube 100 at the lower end of inner barrel 12. The rabbit 104 has longitudinal passages 106 structured as known in the art such that, once an appropriate level of pressure is reached, the encapsulating material 108 above the rabbit 104 flows downwardly through the longitudinal passages 106 until pressure is equalized across the rabbitt 104. As the core 51 enters the lower end of the inner tube 100, the core 51 presses upward against the piston 102, opening passages 106. At some point, the core 51 moves upwardly a sufficient distance to force the rabbit upwardly and the encapsulating material 108 relatively downwardly through the longitudinal passages 106 in the rabbit 104 to surround the core 51.

Once the desired core sample 51 is obtained, the core sample 51 is isolated using valve ball 44 and the encapsulating material 108 is permitted to completely surround the core sample 51. The encapsulated core sample 51 then is transported to the surface within core barrel 10. As the ascent to the surface begins, the temperature to which the core sample is exposed will begin to decrease. Once the temperature reaches an expected low, e.g., 48.80° C. (120° F.), the encapsulating material should begin to viscosify or solidify. The encapsulating material will be completely viscosified or solidified while pressurized core sample 51 maintains its integrity before the pressure within the inner tube 100 is bled off at the surface.

EXAMPLE 1

In this first example, a non-pressurized core sample was taken from a formation in the North Sea. The downhole static temperature in the formation was about 85° C. (185° F.) and the downhole circulating temperature was about 71.11 ° C. (160° F.). The sample removed from the formation was sent to the laboratory and subjected to 1,378,952 Newtons/m² (200 psi) pressure and to a temperature of about 65.56° C. (150° F.).

An encapsulating material having the following composition was formulated:

---
23.8% 8M polyethylene glycol
("CARBOWAX Polyethylene Glycol" 8,000)
59.5% 20M polyethylene glycol
("CARBOWAX Polyethylene Glycol" 20,000)
5.5% "WO-30"
11.1% "MIL CARB"
---

Note that the ratio of 20M:8M polyethylene glycol was approximately 2:1.

"CARBOWAX Polyethylene Glycol" 8,000 was obtained from Union Carbide Corporation, and is 100% polyoxyethylene 8,000, a polyethylene glycol derivative having a molecular weight of 7,000–9,000, "CAS"#25322-68-3. "CARBOWAX Polyethylene Glycol" 20,000 was obtained from Union Carbide Corporation, and is a 100% polyethylene 20,000, a polyethylene glycol derivative having a molecular weight of 15,000–20,000, "CAS"#37225-26-6. "WO-30" and "MIL CARB" are products that may be obtained from Baker Hughes Inteq, P.O. Box 22111, Houston, Tex. 77227.

The following were the physical characteristics of the resulting encapsulating material:

| | |
|---|---|
| Decomposition Point > | 200° C. (392° F.) |
| Melting Point = | 57.77° C. (135° F.) |
| Specific Gravity = | 1.075 at 80/20° C. |
| Vapor Pressure @ 20° C. (68° F.) = | Nil |
| Vapor Density = | >1 |
| Solubility in Water (% by wt) = | 50 at 20° C. (68° F.) |
| Appearance and Odor = | White solid (flake, powder or molten); mild odor. |

The core sample was encapsulated in the foregoing material, and the pressure and temperature on the encapsulated core sample gradually were reduced to ambient. The core sample then was analyzed, and it was determined that the encapsulating material had not invaded the core sample.

EXAMPLE 2

Core samples taken from the same North Sea formation as in Example 1 were exposed to 1,378,952 Newtons/m² (200 psi) pressure and 65.56° C. (150° F.) and encapsulated in materials having the following formulations:

| | Compositions of Encapsulating Materials Tested | | | | | |
|---|---|---|---|---|---|---|
| Sample | % 20M | % 8M | Ratio | % "WO-30" | % "MIL-CARB" | Ratio |
| 1 | 55.5 | 27.8 | 2:1 | 5.5 | 11.1 | 1:2 |
| 2 | 41.7 | 41.7 | 1:1 | 5.5 | 11.1 | 1:2 |
| 3 | 0..0 | 83.3 | 0:1 | 5.5 | 11.1 | 1:2 |
| 4 | 59.5 | 223.8 | 1:2.5 | 5.5 | 11.1 | 1:2 |
| 5 | 35.7 | 35.7 | 1:1 | 9.5 | 19.5 | 1:2 |
| 6 | 38.5 | 38.5 | 1:1 | 7.7 | 15.4 | 1:2 |
| 7 | 41.7 | 41.7 | 1:1 | 5.5 | 19.5 | 1:2 |
| 8 | 41.7 | 41.7 | 1:1 | 5.5 | 15.4 | 1:2 |
| 9 | 41.7 | 41.7 | 1:1 | 5.5 | 11.1 | 1:2 |

The melting point of sample 2 was 63.89° C. (147° F.) and the melting point of sample 4 was 57.22° C. (135° F.).

The core samples were encapsulated in the foregoing materials, and the pressure and temperature on the encapsulated core samples were gradually reduced to ambient. The core samples then were analyzed, and it was determined that the encapsulating material had not invaded the core samples.

The method of the present invention employing the core barrel 10 and encapsulating gel as described above will be hereinafter described.

The method of the present invention comprises placing a small quantity or pill, for example two barrels, of a special extremely viscous, low spurt loss coring fluid compatible with the drilling fluid already in the borehole annulus and at the bottom thereof when coring is to be commenced. The pill may be omitted if the formation is of relatively low permeability. The pill may be placed, for example, by spotting the coring fluid in the drill pipe at the rig floor and running a wiper above it. Selection and formulation of such a fluid is within the ability of one of ordinary skill in the "drilling mud" art, and so the details thereof will not be described. The core barrel 10 is then run into the borehole at the end of the drill string with the inner tube 100 filled with a non-invasive gel as described above for encapsulating the core. The inner barrel nitrogen reservoir 40 has been filled, and the pressure regulator 41 set to the assumed formation reservoir pressure. The core barrel 10 is then tagged into the pill at the borehole bottom, and a coring fluid having characteristics similar or substantially identical to that of the fluid pill is circulated down the drill string to the core barrel. Core barrel 10 then tags the bottom of the borehole, displacing the preplaced coring fluid pill (if used), and the string is rotated and coring commenced as coring fluid circulation down the drill string reaches the core barrel. The core is cut while continuously circulating the coring fluid to protect the formation/core bit interface and protect the formation rock from drilling fluid damage. The core is encapsulated as it enters inner tube 100 as the non-invasive gel 108 is extruded about it. When coring is completed, the core barrel is picked up off bottom, ball 35 is dropped to release outer barrel 11 and the core barrel ball valve 44 is closed due to the downward movement of outer barrel 11 under the forces of gravity and differential hydraulic pressure. The core barrel with encapsulated core sample 51 under pressure is pulled frown the borehole, the regulated pressurized nitrogen maintaining the core sample 51 in a pressurized state. At the surface, core gas pressure in the barrel is checked and recorded. Core gas pressure is then bled off at a rate contemplated to minimize liquid depletion from the core while maximizing gas emanation therefrom, the rapidity of bleeding also depending upon the hardness of the formation, a hard formation permitting faster depressurization without core damage than a soft one. A gas sample may be collected during bleeding, if desired. At the same time pressure in the core sample is bled off, the coring fluid in the inner tube/outer barrel annulus is bled off to avoid collapse of the inner tube under the surrounding barrel annulus pressure. When the core barrel is entirely depressurized, the inner tube from the core barrel with gel-encapsulated core sample 51 is removed for shipment to a laboratory for analysis. Thus, unlike conventional pressure coring operations where the core sample must be frozen and maintained in such a state during transport, the present invention provides an encapsulated, mechanically sound core with substantial chemical integrity in a form which may be easily transported without special equipment or precautions.

While the present invention has been described in terms of an illustrated embodiment, it is not so limited, and many additions, deletions and modifications thereto will be readily appreciated and may be effected by one of ordinary skill in the an without departing from the scope of the invention as claimed herein. For example, a formation gas sample at formation pressure may be trapped in a reservoir within the core barrel as the core barrel is withdrawn from the borehole. A nitrogen reservoir and attendant hardware may be eliminated, the core sample being trapped under pressure as described above, but no artificial support therefor provided in the core barrel as the barrel is withdrawn and ambient temperature decreases.

What is claimed is:

1. An apparatus for taking a core sample of rock from a subterranean formation, comprising:
   a pressure core barrel including:
   an outer barrel having a core bit secured to the lower end thereof adapted to cut said core sample for receipt by said core barrel;
   an inner tube assembly adapted to receive said core sample and maintain said core sample under pressure; and
   a non-invasive gel disposed in said inner tube assembly for encapsulating said core sample as it is received by said inner tube.

2. The apparatus of claim 1, wherein said inner tube assembly includes a valve at the lower end thereof for sealing said inner tube assembly and maintaining said pressure.

3. The apparatus of claim 1, wherein said core bit comprises an anti-whirl core bit.

4. The apparatus of claim 1, further including a cooperative cutter arrangement on said core bit and an adjacent pilot shoe at the lower end of said inner tube assembly configured and mutually arranged to protect said core sample from drilling mud contamination as said core sample is being cut and received in said inner tube assembly.

5. The apparatus of claim 4, wherein said core bit comprises an anti-whirl core bit.

6. A method of taking a core sample of rock from a subterranean formation at the bottom of a borehole filled with drilling fluid, comprising:
   providing a pressure core barrel including an outer barrel having a core bit secured to the lower end thereof, and an inner tube assembly structured to receive a core sample cut by said core bit and to maintain said core sample under pressure;
   disposing a quantity of non-invasive gel in said inner tube assembly;
   running said core barrel to the bottom of said borehole at the end of a drill string;
   cutting said core sample by rotating said outer barrel with said drill string and engaging said formation with said core bit;
   receiving said core sample in said inner tube assembly as it is cut and encapsulating said core sample as it is received with said non-invasive gel;
   trapping said core sample under pressure in said inner tube assembly; and
   retrieving said core barrel with said pressurized, encapsulated core sample contained in said inner tube assembly.

7. The method of claim 6, further including spotting a pill of coring fluid having a high viscosity, low spurt loss and compatibility with said drilling fluid at the bottom of said borehole before placing said core barrel at the bottom of said borehole.

8. The method of claim 7, further including tagging into said pill with said pressure core barrel immediately before cutting said core sample.

9. The method of claim 8, further including circulating an additional quantity of coring fluid having a high viscosity, low spurt loss and compatibility with said drilling fluid down said drill string through said drill string and cutting said core sample of said rock while circulating said coring fluid out of said core bit against said formation.

10. The method of claim 9, further including bleeding off pressure in said inner tube assembly after said retrieval, and trapping a sample of gas contained in said inner tube assembly.

11. The method of claim 10, further including draining coring fluid trapped in said core barrel.

12. The method of claim 11, wherein said bleeding off pressure and removing coring fluid are performed substantially simultaneously.

13. The method of claim 7, further including the step of circulating an additional quantity of coring fluid having a high viscosity, low spurt loss and compatibility with said drilling fluid down said drill string through said drill string and cutting said core sample of said rock while circulating said coring fluid out of said core bit against said formation.

14. The method of claim 6, further including bleeding off pressure in said inner tube assembly after said retrieval, and trapping a sample of gas contained in said inner tube assembly.

15. The method of claim 14, further including draining coring fluid trapped in said core barrel.

16. The method of claim 15, wherein said bleeding off pressure and removing coring fluid are performed substantially simultaneously.

17. The method of claim 6, further including circulating a quantity of coring fluid having a high viscosity, low spurt loss and compatibility with said drilling fluid down said drill string through said drill string and cutting said core sample of said rock while circulating said coring fluid out of said core bit against said formation.

* * * * *

UNITED STATES PATENT AND TRADEMARK OFFICE
CERTIFICATE OF CORRECTION

PATENT NO. : 5,482,123
DATED : January 9, 1996
INVENTOR(S) : Collee

It is certified that error appears in the above-indentified patent and that said Letters Patent is hereby corrected as shown below:

In the Abstract, line 7, change "care" to --core--;

In Column 1, line 33, after "core" insert --analysis--;

In Column 3, line 25, change "whiff" to --whirl--;

In Column 4, line 64, change "frown" to --from--;

In Column 5, line 8, change "whiff" to --whirl--;

In Column 6, line 29, insert a comma after "2C";

In Column 6, line 39, after "from" change "me" to --the--;

In Column 7, line 56, insert a comma after "increases";

In Column 8, line 19, change "carded" to --carried--;

In Column 8, line 25, delete comma after "43";

In Column 9, line 15, change "anti-whir" to --anti-whirl--;

In Column 9, line 59, change "beating" to --bearing--;

In Column 9, line 61, change "tile" to --the--;

In Column 9, line 62, change "tile" to --the--;

In Column 14, in the table after Example 2, on Sample 4, change "223.8" to --23.8--;

In Column 15, line 20, change "frown" to --from--;

In Column 15, line 48, change "an" to --art--; and

Claims In Column 17, line 1, delete "the step of".

Signed and Sealed this

Twenty-first Day of May, 1996

Attest:

BRUCE LEHMAN

*Attesting Officer*   *Commissioner of Patents and Trademarks*